United States Patent [19]

Chen et al.

[11] Patent Number: 5,132,660

[45] Date of Patent: Jul. 21, 1992

[54] VEHICLE SECURITY SYSTEM

[75] Inventors: Chau-ho Chen, Taichung; Chih-hung Shee, Taipei, both of Taiwan

[73] Assignee: Nutek Corporation, Taipei, Taiwan

[21] Appl. No.: 639,121

[22] Filed: Jan. 9, 1991

[51] Int. Cl.[5] ............................................. B60R 25/10
[52] U.S. Cl. ................... 340/428; 340/425.5; 340/426; 340/539; 340/825.69; 307/10.1; 307/10.2; 307/10.3
[58] Field of Search ............ 340/428, 426, 425.5, 340/539, 825.69, 625.72; 361/171, 172; 307/10.1-10.3, 10.6; 180/167, 271, 287

[56] References Cited

U.S. PATENT DOCUMENTS

| | | | |
|---|---|---|---|
| 4,383,242 | 5/1983 | Sassover | 340/539 |
| 4,754,255 | 6/1988 | Sanders et al. | 340/825.69 |
| 4,794,368 | 12/1988 | Grossheim et al. | 340/527 |
| 4,887,064 | 12/1989 | Drori et al. | 340/426 |
| 4,922,224 | 5/1990 | Drori et al. | 340/426 |
| 4,958,084 | 9/1990 | Carlo et al. | 340/428 |
| 5,049,867 | 9/1991 | Stouffer | 340/426 |

*Primary Examiner*—Donnie L. Crosland
*Attorney, Agent, or Firm*—Poms, Smith, Lande & Rose

[57] ABSTRACT

A vehicle security system includes a transmitter, a receiver, a timer, a controller and an alarm circuit. The transmitter transmits selectively an encoded signal when activated by the user. The receiver develops a decoded signal in response to reception and recognition of the encoded signal. The decoded signal has a reception time duration commensurate with a transmission time duration of the encoded signal. The timer develops a momentary timer output signal. The timer output signal is developed in response to initial application of the decoded signal to the timer in the absence of ignition voltage and is developed after a selected timer duration in response to continuous application of decoded signal to the timer and the presence of the ignition voltage only if the reception time duration exceeds the selected time duration. The controller develops a binary signal. The binary signal switches states in response to each occurrence of the timer output signal. Accordingly, the binary signal has a first state indicative of the security system being armed and the second state indicative of the security system being disarmed. The alarm circuit sounds an audible alarm in response to a current being developed in a selected circuit of the electrical system of the vehicle when the binary signal is in its first state.

24 Claims, 5 Drawing Sheets

VEHICLE SECURITY SYSTEM

FIELD OF INVENTION

The present invention relates generally to vehicle security systems, and more particularly, to a vehicle security system which is remotely armed and disarmed.

BACKGROUND OF INVENTION

In general, a vehicle security system may operate in several ways to discourage the theft of a vehicle or the tampering with the contents therein. For example, a vehicle security system may operate to control ignition disablement, sound a theft triggered alarm, or both of these.

In one type of a vehicle anti-theft system, a receiver is mounted in the trunk of an automobile. The receiver is connected to the electrical system of the automobile, and when the system is "armed" the ignition system is disabled from operating. In order to operate the vehicle, a hand held transmitter is operated at the same time that the ignition system of the vehicle is turned on. The receiver recognizes the coded signal and inhibits further disablement of the ignition system. The system is armed automatically whenever the ignition is turned off. A key operated switch on the receiver is provided to allow the driver to deactivate the anti-theft system when such deactivation is desired. For example, one would deactivate the system when the car is parked by attendants with whom the key is left in a public garage.

It would appear that the automatic arming feature is a desirable one in that no action is required on the part of the operator to arm the system. The security controls of the anti-theft system are put into effect automatically when the ignition system is turned off. However, the automatic arming feature also has a significant disadvantage and limitation. This disadvantage and limitation may outweigh any of the advantages of the automatic arming feature in many cases.

For example, there are many times when an operator does not want to arm the anti-theft system. For example, the operator may desire to remain nearby the automobile and would accordingly not desire to be bothered by having to operate the transmitter in order to enable the ignition system upon the return to the vehicle. Another example is where the anti-theft system is equipped with an audible alarm which sounds in response to an attempt being made to gain unauthorized access to the vehicle. It is apparent that such a feature, the automatic arming, could pose a problem.

With automatic arming, the driver must be given time to leave the vehicle before the alarm system is enabled. Otherwise, when he opens the door in order to exit the vehicle, the alarm will be triggered. It is standard practice, therefore, in the case of vehicles having alarm systems which are automatically armed, to delay the arming of the system for a short time after the ignition is turned off, for example, thirty seconds. Conversely, a second delay, of perhaps fifteen seconds, is required to allow the authorized operator to re-enter the vehicle upon his return and disarm the system. The problem with this approach is that a trained automobile thief can foil the system before the short time delays have elapsed.

The use of time delays for ingress and egress from the vehicle while the alarm system is armed has been eliminated by the use of the transmitter, not only to disarm the system upon returning to the automobile, but also to arm it after leaving, as soon as the driver shuts and locks the door and is walking away from the vehicle. He may operate the transmitter at any time within the vicinity of the vehicle to arm or disarm the system.

This type of system has the advantage in that it will foil an attempt by any thief to enter the automobile after the driver has left and before the arming delay interval has expired. One prior art alternative to accomplishing this object is to provide a key operated switch on the outside of the vehicle itself, and it is certainly far easier to push a transmitter button in ones pocket than it is to take out and use a key for arming a system as is customary practice, not to mention that such a key switch is vulnerable to expert assault.

Furthermore, when the ignition system of the vehicle is on, the system may not be armed if the transmitter is activated to develop the encoded signal. The purpose of this feature is to prevent the disabling of the vehicle, such as by ignition cut off, when the vehicle is being operated and the transmitter inadvertently activates the receiver. However, a disadvantage and limitation of this feature is that when the user wants to leave the car shortly, for example, to make a telephone call, and keep the engine running, the system may not be armed. Yet another example when it is desirable to keep the engine running or at least keep the ignition system of the vehicle on, is when the operator wishes to pull into a rest stop and sleep inside the automobile and keep the radio or air conditioning operating, the above anti-theft system could not be armed while continuing to protect the car. Therefore, it is highly desirable to provide a security system which has both a theft deterrent and an occupant protection feature.

SUMMARY OF THE INVENTION

According to the present invention, the above disadvantages and limitations of the prior art are overcome by adding an ignition system control timer to allow the vehicle security system to be armed while the ignition system is on. When the ignition system is on, a longer reception of the coded signal is required to arm the security system to avoid the system from being armed accidentally.

In one aspect of the present invention, the vehicle security system includes a transmitter, a receiver, a timer, a controller and an alarm circuit. The transmitter transmits selectively an encoded signal when activated by the user. The receiver develops a decoded signal in response to reception and recognition of the encoded signal. The decoded signal has a reception time duration commensurate with a transmission time duration of the encoded signal. The timer develops a momentary timer output signal The timer output signal is developed in response to initial application of the decoded signal to the timer in the absence of ignition voltage and is developed after a selected timer duration in response to continuous application of decoded signal to the timer and the presence of the ignition voltage only if the reception time duration exceeds the selected time duration The controller develops a binary signal. The binary signal switches states in response to each occurrence of the timer output signal. Accordingly, the binary signal has a first state indicative of the security system being armed and the second state indicative of the security system being disarmed. The alarm circuit sounds an audible alarm in response to a current being developed in a selected circuit of the electrical system of the vehicle when the binary signal is in its first state. Alternatively, the vehicle security system has an anti-theft circuit instead of the alarm circuit or in addition thereto. The anti-theft circuit is responsive to the binary signal being in the first state and renders the ignition switch inoperative when moved to the start position. For example, a relay may be placed in series with the ignition switch start terminal and the starter solenoid of the vehicle. The relay is opened when the binary signal is in its first state.

These and other objects, advantages and features of the present invention will become readily apparent to those skilled in the art from the study of the following description of an exemplary preferred embodiment when read in conjunction with the attached drawings and appended claims.

DESCRIPTION OF AN EXEMPLARY PREFERRED EMBODIMENT

Referring now to the Drawings, there is shown a vehicle security system 10 (FIG. 1) constructed according to the principles of the present invention. A typical vehicle (not shown) has an electrical system, a portion of which is exemplary illustrated at 12 (FIG. 4B), and an ignition switch 14 (FIG. 4B). The ignition switch 14 is movable between an open OFF position, a closed ON position and a START position. As is well known in the art, when the ignition switch is the ON position, electrical system voltage is available to the ignition and primary accessory circuits. When the ignition switch 14 is momentarily moved to the START position, a starting solenoid 16 (FIG. 4B) is energized so that a drive pinion (not shown) of a starter motor 18 meshingly engages an engine flywheel (not shown) as is well known When the ignition switch 14 is released from the START position, it moves back to the ON position to maintain ignition primary voltage in the electrical system and, thus, operation of the vehicle.

Figures 1, 2A, 2B:
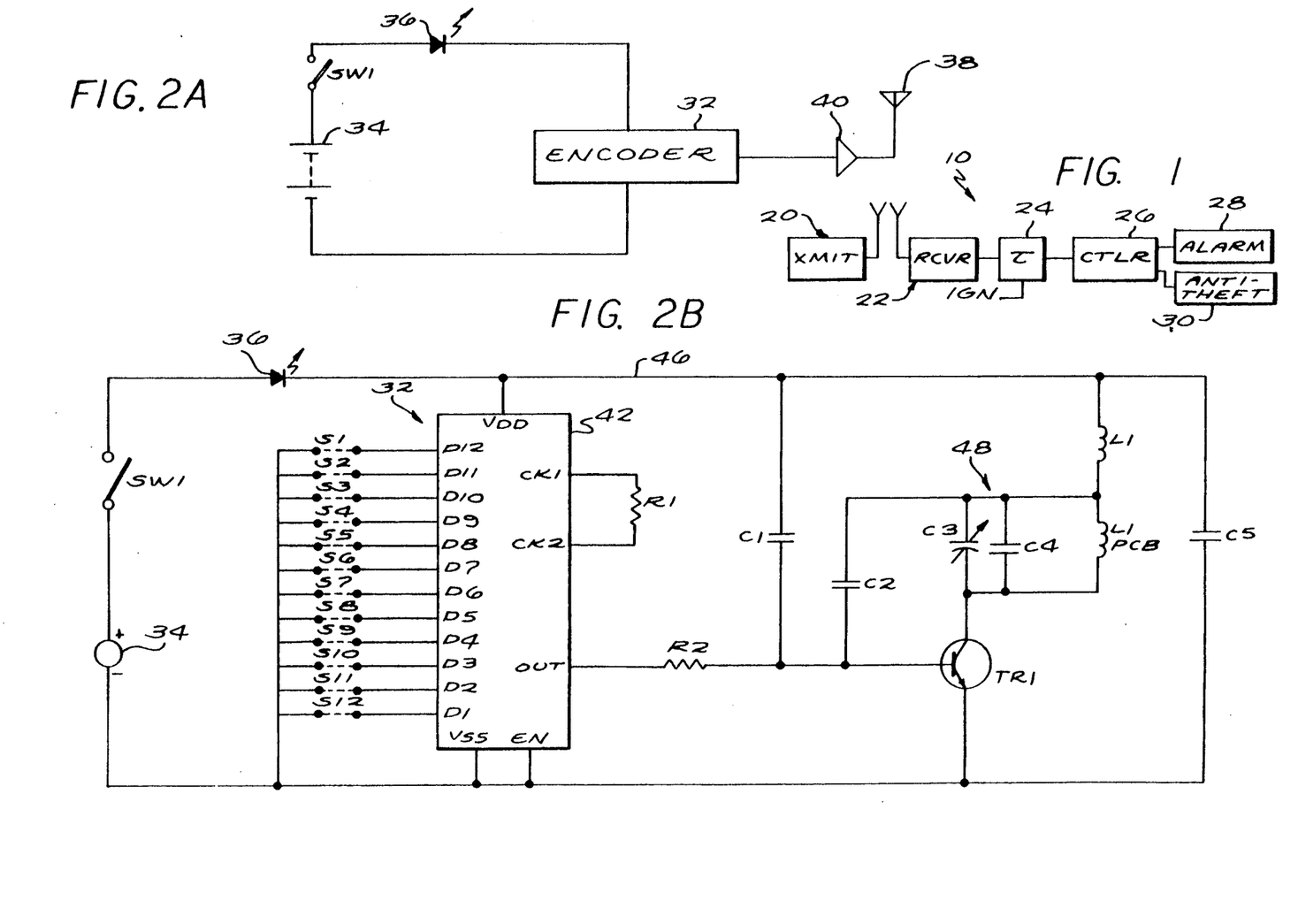
FIG. 1 is a block diagram of a vehicle security system constructed according to the principles of the present invention.
FIG. 2A is a functional block diagram of a transmitter used in the vehicle security system of the present invention.
FIG. 2B is a more detailed schematic diagram of the transmitter of FIG. 2A.

According to the present invention, the vehicle security system 10 includes a transmitter 20 a receiver/decoder 22, a timer 24, a controller 26 and one or both of an alarm circuit 28 and an anti-theft circuit 30. The transmitter 20 selectively transmits an encoded signal and the receiver 22, in response to reception and recognition of the encoded signal, develops a decoded signal. The decoded signal has a reception time duration commensurate with the transmission time duration of the encoded signal. The timer 24 has two modes of operation to develop a momentary timer output signal. In the first mode, the timer output signal is developed in response to initial application of the decoded signal to the timer 24 in the absence of the ignition voltage. In the second mode, the timer output signal is developed after a selected time duration in response to continuous application of the decoded signal to the timer 24 in the presence of the ignition voltage only if the reception time duration exceeds the selected time duration. The controller 26 develops a binary signal which switches states in response to each occurrence of the timer output signal. The binary signal thus has a first state indicative of the security system 10 being armed and a second state indicative of the security system being disarmed. The alarm circuit 28 sounds an audible alarm in response to a current being developed in a selected circuit of the electrical system, such as the circuit 12 (FIG. 4B), when the binary signal is in the first state. The anti-theft circuit 30 renders the START position of the ignition switch 14 inoperative when the binary signal is in the first state. It is a feature of the present invention that the operation of the vehicle is not disabled by the anti-theft circuit 30. Thus, with the ignition on the security system 10 may be armed to provide for occupant security, and the like. Each of the above elements of the present invention are set forth in greater detail hereinbelow.

With particular reference to FIG. 2A, there is shown a functional block diagram of the transmitter 20 used in the vehicle security system 10 of the present invention. The transmitter 20 includes an encoder 32 which transmits the encoded signal when turned on by the user. To turn the encoder 32 on, a switch SW1 is depressed by the user, thereby completing the circuit path between the encoder 32 and a battery 34. A light emitting diode (LED) 36 may be coupled in series between the switch SW1 and the encoder 32 such that when the switch SW1 is closed, the LED 36 becomes forward biased to provide an indication that the encoder 32 is developing an encoded output signal and, hence, the transmitter 20 is transmitting the encoded signal. The encoded signal, developed by the encoder 32, is transmitted by an antenna 38. The antenna 38 is driven by an oscillator amplifier 40 which receives the encoded signal from the encoder 32.

With further reference to FIG. 2B, the encoder 32 may be based upon an encoder IC 42, such as the commercially available NTK12E encoder. The voltage from the battery 34, is applied to the upper voltage supply input $V_{dd}$ of the encoder IC 42 when the switch SW1 is closed. The lower voltage supply $V_{ss}$ and the enable input EN of the encoder IC 42 are both coupled to the negative terminal of the battery 34. The encoder 32 also includes a plurality of switches, S1-S12. Each of the switches S1-S12 are electrically coupled between the negative terminal of the battery 34 and a respective data input D1-D12 of the encoder IC 42. Each of the switches S1-S12 is preset in an open or closed position to provide a unique code for the transmitter 20. It is to be understood that any number of switches can be used depending on the number of data inputs for a particular type of encoder IC used. The use of twelve such switches allows for 4,096 different codes. A resistor R1 is coupled between the clock input CK1, CK2 of the encoder IC 42. The resistor R1 exemplary may be a 1.5 mΩ resistor.

When the encoder chip 42 is turned on, it sequentially encodes and transmits the twelve input bits from the inputs S1–S12 in accordance with whether the respective one of the switches S1–S12 is in an opened or closed position indicating a 1 or 0 data bit. The switches S1–S12 may exemplary be provided in a dual inline package for compactness or may be open or short circuit traces on a printed circuit card. It is contemplated with this arrangement of the encoder 32 that the transmitter 20 be of small compact design so that it may readily be carried on a key chain along with the keys to the vehicle.

The oscillator amplifier 40 includes an npn transistor TRI (FIG. 2B) whose emitter is coupled to the negative terminal of the battery 34 and whose base is coupled to the output of the encoder IC 42 through a resistor R2. A capacitor C1 is coupled between the base of transistor TRI and a positive voltage supply line 46 which is coupled to the positive terminal of the battery 34 through switch SW1 (as is $V_{dd}$). An LC oscillator circuit 48 includes an inductor L1 coupled between the collector of transistor TR1 and the voltage supply line 46. A capacitor C2 is coupled between a center tap of inductor L1 and the base of transistor TR1. The variable capacitor C3 is coupled between the collector of transistor TR1 and the center tap of conductor L1. A fixed capacitor C4 is coupled in parallel with capacitor C3. Finally, a capacitor C5 is coupled between the supply voltage line 46 and the negative terminal of battery 34.

In an exemplary embodiment of the present invention, capacitor C1 and C4 are each 3.3 pf capacitors, capacitor C2 is a 4.7 pf capacitor, capacitor C3 is a variable 2–7 pf, and C5 is a 0.001 mf. Inductor L1 is a 1.5 mh inductor. Resistor R2 is a 33 kΩ resistor. The antennae 38 is also formed by the portion of the inductor L1 between the collector of transistor TR1 and its center tap.

Figure 5A:
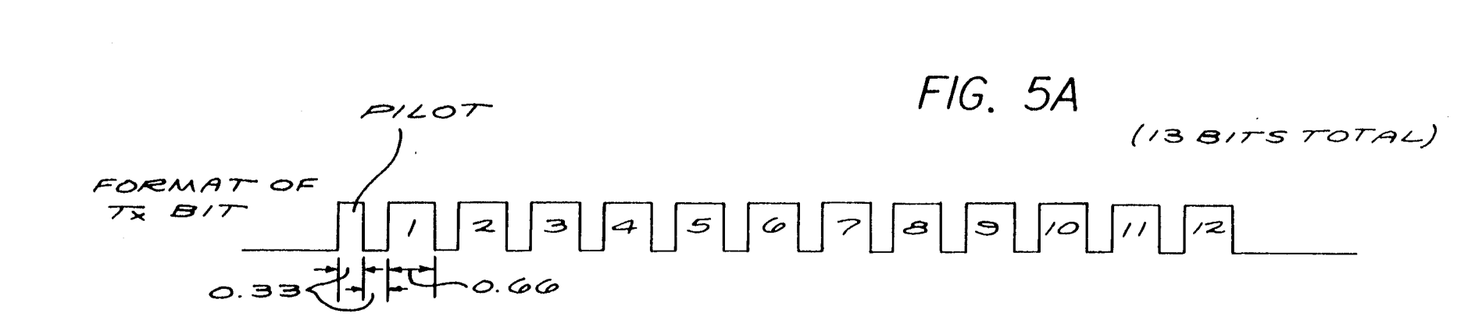
FIGS. 5A-5C are waveforms useful in explaining the operation of the transmitter of FIG. 2B.
Figure 5B:
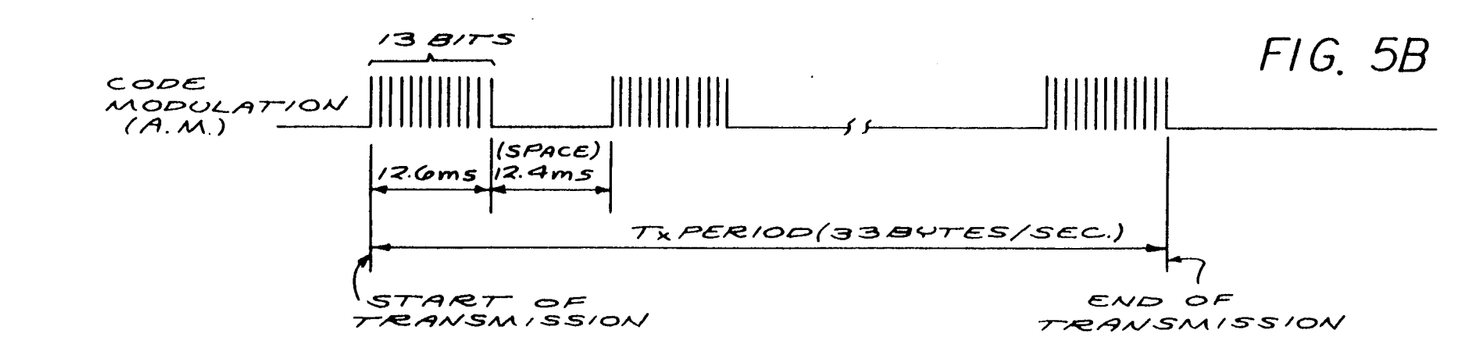
Figure 5C:
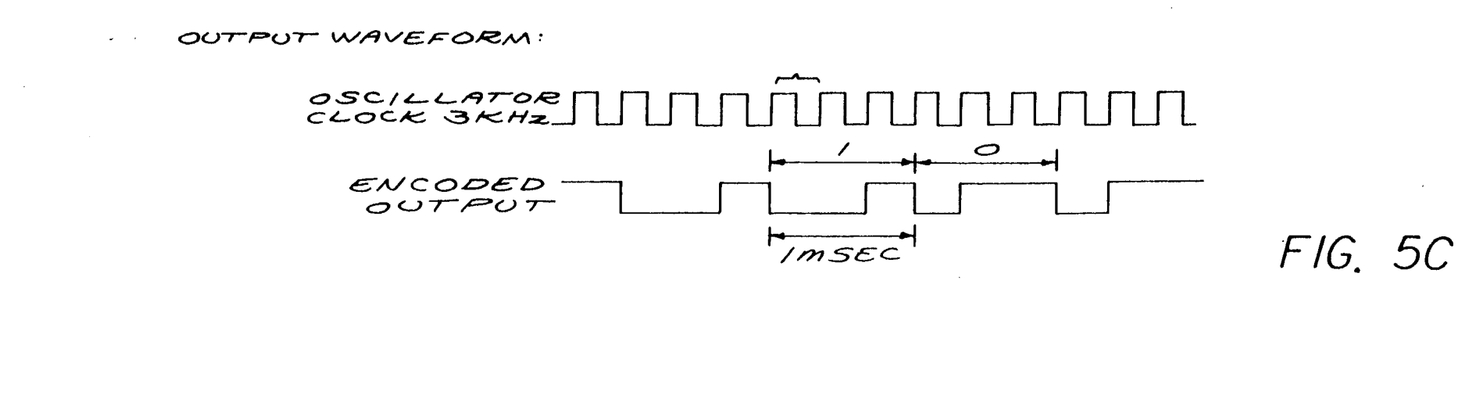

With further reference to FIG. 5A–5C, there are shown waveforms useful in explaining the operation of the transmitter 20. When the encoder IC 42 is turned on, it sequentially transmits thirteen bits, a first one of these bits being a pilot bit and the remaining twelve bits each corresponding to one of the data inputs D1–D12. As is best seen in FIG. 5A, the pilot bit has a duration of 0.33 milliseconds. Each of the databits has a time period of one millisecond with a 0.33 milliseconds off time. If the bit is high for the remaining 0.67 milliseconds, then such data bit encodes a 0. However, if in the remaining 0.67 milliseconds only the final 0.33 milliseconds are high, then the data bit encodes a 1, as best seen in FIG. 5C. The output of the encoder IC 42 develops each of the 13 bits within 12.6 milliseconds with a dead time of 12.4 milliseconds between each burst of 13 bits. The total transmit period is 33 bytes per second as best seen in FIG. 5B. The self running oscillator amplifier 40 develops a signal at three kilohertz which is pulse code modulated by the output of the encoder IC 42. Accordingly, three complete clock cycles occur for each data bit, as seen in FIG. 5C.

Figure 3A:
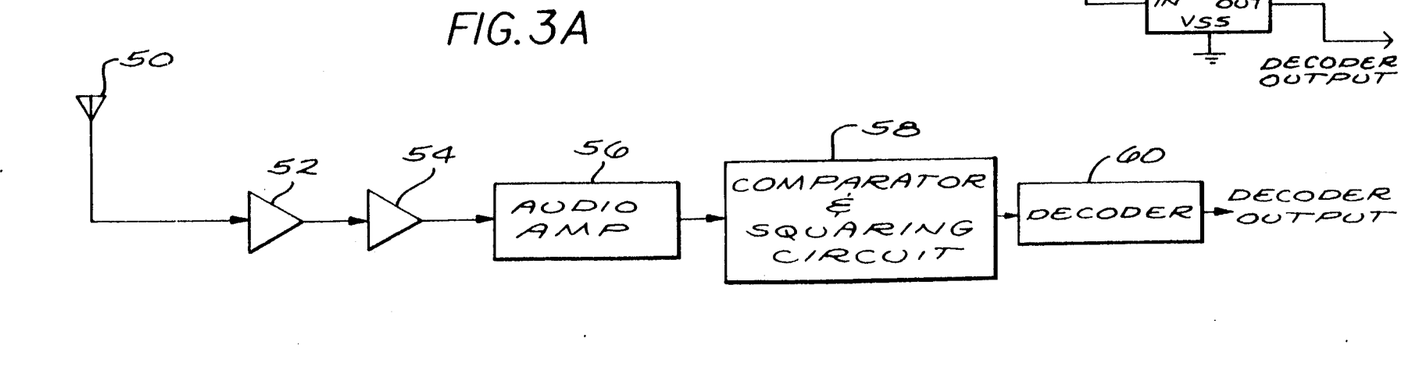
FIG. 3A is a functional block diagram of a receiver/decoder used in the vehicle security system of the present invention.

With reference to FIG. 3A, there is shown a functional block diagram of the receiver 22 of FIG. 1. The receiver 22 includes an antenna 50 which receives the transmitted encoded signal, of first amplifier 52, the tuned regenerative amplifier 54, an audio amplifier 56, a comparitor and squaring circuit 58, and a decoder 60. The antennae 50 receives the transmitted signal and develops an electrical signal which is then amplified by the first amplifier 52. The amplified received signal is then applied to the regenerative amplifier 54. The regenerative amplifier 54 is tuned to the frequency of the audio amplifier (FIG. 2A). The output of the regenerative amplifier 54 is deemed the transmitted signal demodulated to represent the data output of the encoder IC 42 (FIG. 2B). The demodulated signal is then applied to the audio amplifier 56 to boost the signal level. The output of the audio amplifier 56 is then applied to the comparitor and squaring circuit 58. The output of the comparitor and squaring circuit should thus be a faithful representation of the data output of the encoder IC 42. This data is then applied to the corresponding decoder 60 which, is the data pattern set by switches S1–S12 is recognized by the decoder 60, a decoder output signal goes high.

Figure 3B:
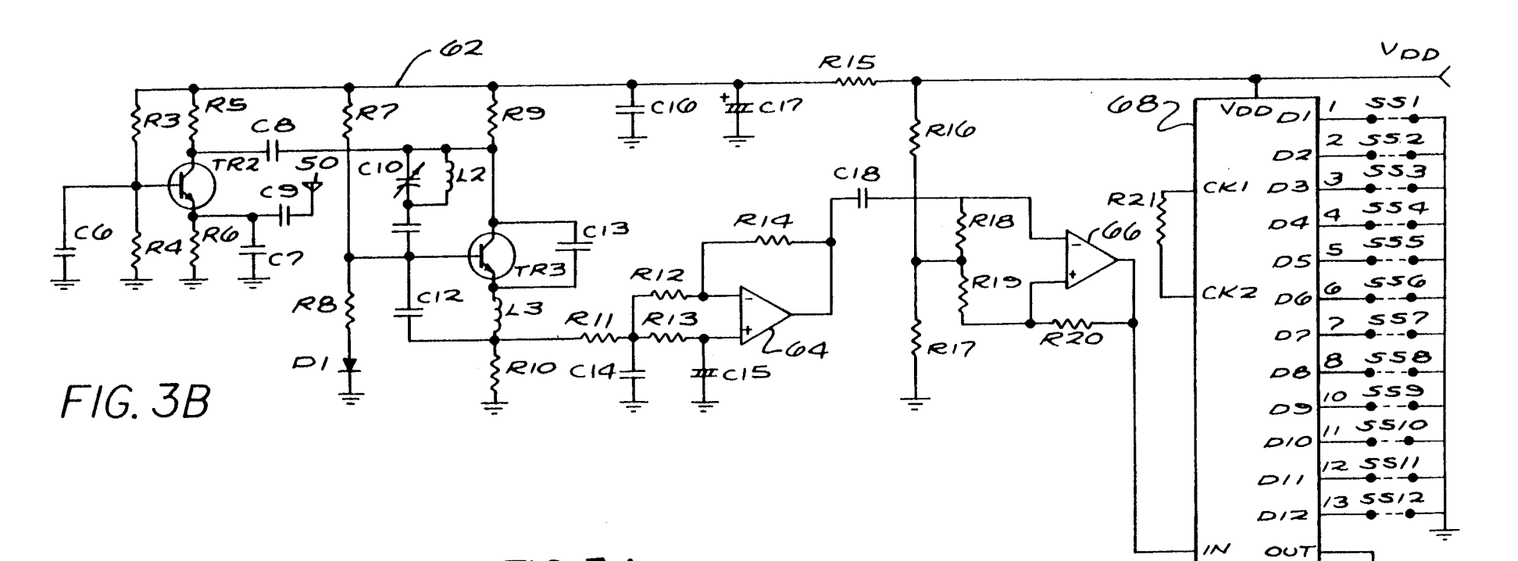
FIG. 3B is a more detailed schematic diagram of the receiver/decoder of FIG. 3A.

With further reference to FIG. 3B, there is shown a detailed circuit diagram of the functional block diagram in FIG. 3A. The first amplifier 52 includes a transistor TR2 bias in a common base configuration. Accordingly, the base of transistor TR2 is coupled to ground through a capacitor C6. A voltage divider, which includes resistors R3 and R4 is coupled between the upper voltage along a line 62 and ground. The base of transistor TR2 is coupled to the midpoint of this voltage divider. The emitter of transistor TR2 is coupled to line 62 through a resistor R5. A resistor R6 DC biases the emitter of transistor TR2. A capacitor C7 is coupled in parallel to resistor R6. The output at the collector of transistor TR2 is AC coupled through a capacitor CH. The input from antenna 50 is AC coupled through a capacitor $C_9$ in series between the antenna 50 and the emitter of transistor TR2.

The receiver amplifier 54 includes a transistor TR3. A voltage divider to bias the base of transistor TR3 includes a resistor R7 coupled to line 62 and resistor R8 coupled through grounds through diode D1. The base of transistor TR3 is coupled at the intermediate resistor R7 and resistor R8. The output from amplifier 52 is coupled to the collector of transistor TR3 A resistor R9 coupled in series between line 62 and the collector of transistor TR3 provides DC biasing of the collector. The base of transistor TR3 is further coupled to the output of transistor 52 in a filter including capacitor C10 and C11 coupled in series with an inductor L2 and parallel with capacitor C10. Capacitor C10 is a variable tuning capacitor. The output of transistor TR3 is obtained at resistor R10 coupled between ground and to the emitter of transistor TR3 through an inductor L3. At the node between inductor L3 and resistor R10, the capacitor C12 is coupled with the other plate of capacitor C12 being coupled to the base of transistor TR3. A capacitor C13 is coupled between the collector and emitter of transistor TR3. The audio frequency output of transistor TR3 is coupled to the audio amplifier 56 through the resistor R11.

The audio amplifier 56 includes a high gain differential amplifier 64 having the inverting input resistively coupled to output resistor R11 through resistor R12 and a non-inverting input resistively coupled to output resistor R11 through resistor R13. A feed back resistor R14 is coupled between the inverting input and output of the high gain amplifier 64. A capacitor C14 is coupled between the node between resistor R11, resistor R12 and resistor R13 and ground potential. A capacitor C15 is coupled between the non-inverting input of amplifier 64 and ground potential. The output of audio amplifier 56 is AC coupled through a capacitor C18 coupled to the output of high gain amplifier 64. Line 62 is resistively coupled through resistor R15 to battery potential $V_{dd}$. Furthermore, capacitor C16 and C17 are coupled between line 62 and ground potential.

The comparitor and squaring circuit 58 includes a high gain amplifier 66 having an inverting input to which the output of audio amplifier 56 is coupled. The voltage divider coupled between battery potential $V_{dd}$ and ground potential includes resistors R16 and R17. A further voltage divider including resistor R18 and resistor R19 is coupled between the inverting and non-inverting inputs of amplifier 66. The node between resistor R16 and R17 and the node between resistor R18 and R19 are electrically coupled together The feedback resistors R20 is coupled between the non-inverting input and output of high gain amplifier 66. The output of the comparitor and squaring circuit 58 developed at the output of high gain amplifier 66 is coupled to the decoder 60.

The decoder 60 includes a decoder IC 68 which is matched to the encoder IC 42 (FIG. 2B). A resistor R21 is coupled between the CK1 and CK2 clock inputs of the decoder IC 68. The upper bias voltage input $V_{dd}$ of the decoder IC 68 is coupled to battery voltage and the lower bias voltage input $V_{ss}$ is coupled to ground potential. The output of comparitor and squaring circuit 58 is coupled to the input IN of the decoder IC 68. A plurality of switches SS1-SS12 are coupled between a respective one of data inputs D1-D12 and ground potential. Each of the switches SS1-SS12 correspond to one of the switches S1-S12 coupled to the encoder IC 42. The switches SS1-SS12 are configured the same as corresponding switches S1-S12, the decoder IC 68 will recognize the data pattern developed by encoder IC 42. The output OUT of the decoder IC 68 thus develops the decoded signal of the receiver 22.

Figure 4A:
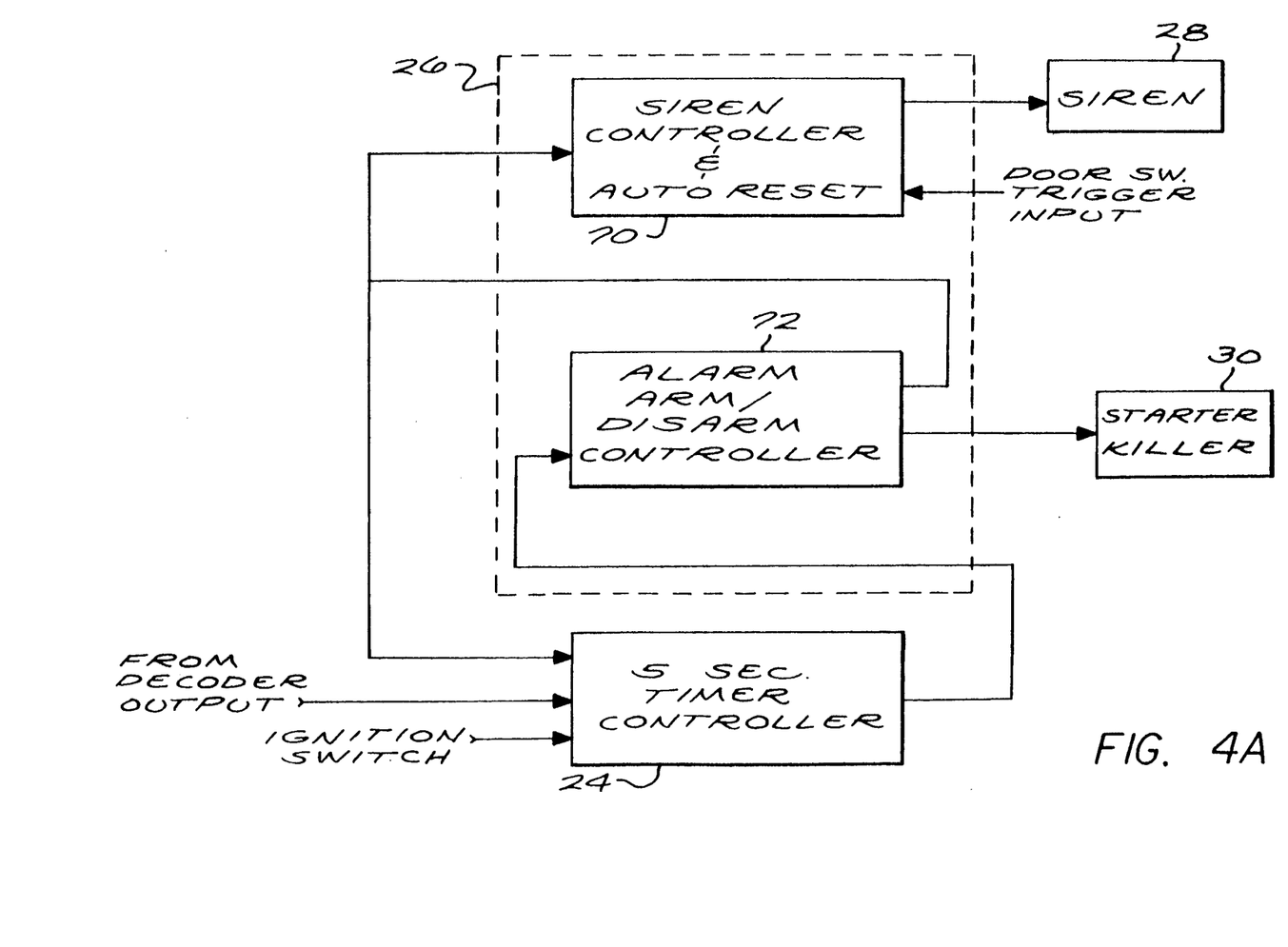
FIG. 4A is a functional block diagram of the timer and controller logic of the vehicle security system of the present invention.
Figure 4B:
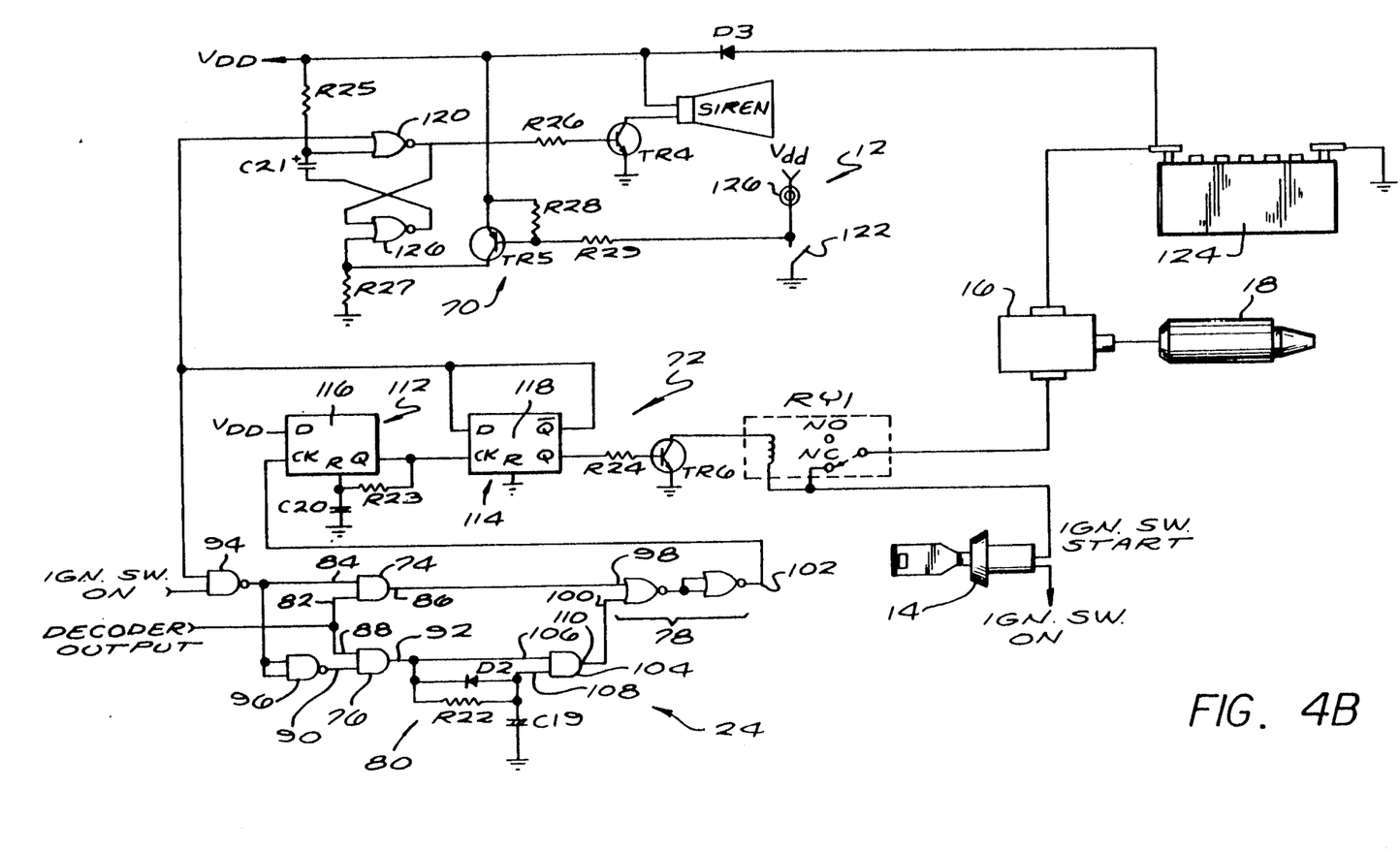
FIG. 4B is a more detailed schematic diagram of the functional block diagram of FIG. 4A.

Referring now to FIG. 4A, there is shown a functional block diagram of the timer 24 and controller logic 26 of the vehicle security system 10. The controller 26 includes a siren controller 70 and an alarm arm/disarm controller 72. The siren controller 70 drives the audible alarm 28 in response to a current in the selected circuit 12, such as a door switch trigger input as will be described in greater detail hereinbelow. The alarm arm/disarm controller 72 drives the anti-theft circuit 30 and also further controls the siren controller 70 and the timer 24. This control is from the binary signal hereinabove described with respect to the controller 26, which has the first state and the second state. As best seen in FIG. 4A, the timer is further responsive to the binary signal developed by the alarm controller 72 such that the timer output signal is developed in response to initial application of the decoded signal when the ignition voltage is present and the binary signals in the first state, as described in greater detail hereinbelow.

With further reference to FIG. 4B, the timer 24 includes a first AND gate 74, a second AND gate 76, an OR gate circuit 78 and a time delay circuit 80. The first AND gate 74 has a first input 82 a second input 84 and an output 86. The second AND gate has a first input 88 a second input 90 and an output 92. The first input 82 of the first AND gate 74 and the first input 88 of the second AND gate 76 are each adapted for application of the decoded signal developed at the output terminal of the decoder 68 (FIG. 3B) The second input 84 of the first AND gate 74 is adapted for application of the above described binary voltage thereto. The second input 90 of the second AND gate 76 is adapted for application of an inverse of this binary voltage. This binary voltage is indicative of the present position of the ignition switch 14 as will be described hereinbelow in greater detail.

The binary voltage is developed as a combination of the binary signal developed by the alarm controller 72 and the ignition switch. The binary signal developed on the controller and the ignition voltage are each applied to a respective input of a NAND gate 94. The output of the NAND gate 94 develops the above described binary voltage applied to the second input 84 of the first AND gate 74. To invert the binary voltage, a second NAND gate 96 has each of its inputs electrically coupled to the output of the first NAND gate 94. The output of the second NAND gate 96 is electrically coupled to the second input 90 of the second AND gate 76.

The OR gate circuit 78 has a first input 98, a second input 100 and an output 102. The output 86 of the first AND gate 74 is electrically coupled to the first input 98 of the OR gate circuit 78. The time delay circuit 80 is serially interconnected between the output 92 of the second AND gate 76 and the second input 100 of the OR gate circuit 78.

In operation, the output 86 of the first AND gate 74 develops a first voltage when each of the decoded signal and the binary voltage are high which indicates reception and recognition of the encoded signal and the absence of the ignition voltage. The output 92 of the second AND gate 76 develops a second voltage when each of the decoded signal and the inverse of the binary voltage are high indicating reception and recognition of the encoded signal and the presence of the ignition voltage. The time delay circuit 80 delays application of the second voltage to the second input 100 of the OR gate circuit 78 for a preselected time duration. The output 102 of the OR gate circuit 78 develops the timer output signal above described with reference to FIG. 4A, in response to either the first voltage or the second voltage.

The time delay circuit 80 includes a resistor R22, a capacitor C19, and a diode D2, and a third AND gate 104. The resistor R22 is electrically coupled in series between the output 92 of the second AND gate 76 and the second input 108 of the third AND gate 104. The capacitor C19 is electrically coupled between the second input 108 of the third AND gate 104 and ground potential. The diode D2 has an anode coupled to the second input 108 of the third AND gate 104 and a cathode coupled to the output 92 of the second AND gate 76. The resistor R22 and capacitor C19 have, respectively, a resistance R and a capacitance C which determines an RC time constant wherein the RC time constant is commensurate with the preselected time duration. The second voltage develops a current in each of the resistor R22 and capacitor C19 to charge the capacitor C19 such that the second voltage becomes applied to the second input 108 of the third AND gate 104 when the second voltage is present for a time exceeding the preselected time duration At such time, the output 110 of the third AND gate 104 goes high, since the voltage at its first input 106 is also high. The diode D2 discharges the capacitor C19 through the output 92 of the second AND gate 76.

The arm controller 72 includes a one shot circuit 112 and a bi-stable circuit 114. The one shot circuit 112 develops a triggering pulse in response to the timer output signal developed by the OR gate circuit 78. The bi-stable circuit 114 develops the binary signal above described. The binary signal switches states in response to the triggering pulse.

More specifically, the one shot circuit 112 includes a D flip flop 116, a resistor R23, and a capacitor C20. The D flip flop 116 has a data input D, a clock input CK, a reset input R and a data output Q. The clock input is adapted for application of the timer output signal developed by the OR gate circuit 78. The data input D is adapted for application of the DC bias voltage, $V_{dd}$. The resistor R23 is coupled between the reset input R and the data output Q. The capacitor C20 is coupled between the reset input R and ground potential. The resistor R 23 and the capacitor C20 have respectfully a resistance and a capacitance which determines a RC time constant wherein the RC time constant determines a decay time of the trigger pulse developed at the data output Q.

The bi-stable circuit 114 includes a second D flip flop 118. The D flip flop 118 has a data input D, a clock input CK, and inverse data output $\overline{Q}$, a data output Q and a reset input R. The clock input CK of the second D flip flop 118 is coupled to the data output Q of the first flip flop 116. The reset input R is coupled to ground potential. The data input of the second flip flop 118 is coupled to the inverse data output Q. The data output Q further develops the above described binary signal.

The data output Q is coupled to the base of a transistor TR6 through a resistor R24. When the data output Q goes high, transistor TR6 is turned on such that the relay RY1 is energized. When the relay is energized, it switches to its NO position disconnecting the starter solenoid 16 from the ignition switch start position. This is a state when the system is armed. When the system 10 is disarmed, the data output Q of the D flip flop 118 goes low, thereby turning transistor TR6 off. The relay RY1 is then in its position as shown in FIG. 4B to make a connection between that starting solenoid 16 and the ignition switch start position.

When the system 10 is disarmed, the binary signal developed by the inverse data output Q of the second flip flop 118 is high. An OR gate 120 has its output accordingly low. A selected circuit 12 such as a door switch 122 is closed indicating a door has been opened, a dome light connected to the battery potential $V_{dd}$ (which is developed by the battery 124 through the diode D3) illuminates a dome light 126. Accordingly, the base of the transistor T15 goes low by current develop through resistors R28 and resistor R29. This in turn causes the voltage at resistor R27 to go high. Accordingly, the voltage at a second OR gate 126 also goes high. When the system is disarmed, this is a don't care situation. However, should the system be armed, the voltage of first NOR gate 120 developed by the binary signal will be low. Accordingly, the output the first NOR gate 120 will go high turning on transistor TR4 through a resistor R26 to sound the siren. A capacitor C21 then becomes charged through a resistor R25 from the supply voltage $V_{dd}$ since the output of the NOR gate 126 goes low. NOR gates 120 and 126 are coupled as a flip flop.

There has been described above a novel vehicle security system constructed according to the principles of the present invention. Those skilled in the art may now make numerous uses of and departures from the above described exemplary embodiment without departing from the principles set forth herein. Accordingly, the present invention is to be defined solely by the scope of the following claims.

We claim:
1. A security system for a vehicle having an electrical system and an ignition switch movable between an open OFF position and a closed ON position wherein an ignition voltage is applied to a first selected circuit of said electrical system when said switch is in said ON position, said security system comprising
   a transmitter to transmit selectively an encoded signal;
   a receiver to develop a decoded signal in response to reception and recognition of said encoded signal, said decoded signal having a reception time duration commensurate with a transmission time duration of said encoded signal;
   a timer to develop a momentary timer output signal wherein said timer output signal is developed in response to initial application of said decoded signal to said timer in the absence of said ignition voltage and is developed after a selected time duration in response to continuous application of said decoded signal to said timer in the presence of said ignition voltage only if said reception time duration exceeds said selected time duration;
   a controller to develop a binary signal, said binary signal switching states in response to each occurrence of said timer output signal, said binary signal having a first state indicative of said security system being armed and a second state indicative of said security system disarmed; and
   an alarm circuit to sound an audible alarm in response to a current being developed in a selected second circuit of said electrical system when said binary signal is in said first state.

2. A security system as set forth in claim 1 wherein said timer is further responsive to said binary signal such that said timer output signal is developed in response to initial application of said decoded signal when said ignition voltage is present and said binary signal is said first state.

3. A security system is set forth in claim 1 wherein said timer includes:
   a first AND gate having a first input, a second input and an output;
   a second AND gate having a first input, a second input and an output, said first input of each of said first AND gate and said second AND gate being adapted for application of said decoded signal thereto, said second input of said first AND gate being adapted for application of a binary voltage and said second input of said second AND gate being adapted for application of an inverse of said binary voltage, said binary voltage being indicative of the present position of said ignition switch;
   an OR gate circuit having a first input, a second input and an output, said output of said first AND gate being electrically coupled to said first input of said OR gate circuit; and
   a time delay circuit serially interconnected between said output of said second AND gate and said second input of said OR gate circuit;
   said output of said first AND gate developing a first voltage when each of said decoded signal and said binary voltage are high indicating reception and recognition of said encoded signal and the absence of said ignition voltage, and said output of said second AND gate developing a second voltage when each of said decoded signal and said inverse of binary voltage are high indicating reception and recognition of said encoded signal and the presence of said ignition voltage;

said time delay circuit delaying application of said second voltage to said second input of said OR gate circuit for said preselected time duration; and said output of said OR gate circuit developing said timer output signal in response to either of said first voltage and said second voltage.

4. A security system as set forth in claim 3 wherein said time delay circuit includes:

a third AND gate having a first input, a second input and an output, said first input of said third AND gate being electrically coupled to said output of said second AND gate;

a resistor electrically coupled serially between said output of said second AND gate and said second input of said third AND gate;

a capacitor electrically coupled between said second input of said third AND gate and ground potential, said resistor and said capacitor having respectively a resistance, R, and a capacitance, C, which determines a RC time constant where said RC time constant is commensurate with said preselected time duration; and a diode having an anode coupled to said second input of said third AND gate and a cathode coupled to said output of said second AND gate;

said output of said third AND gate being coupled to said second input of said OR gate circuit;

said second voltage developing a current in each of said resistor and said capacitor to charge said capacitor such that said second voltage becomes applied to said second input of said OR gate circuit when said second voltage is present for a time exceeding the preselected time duration; and said diode discharging said capacitor through said output of said second AND gate.

5. A security system as set forth in claim 4 wherein said timer further includes:

a NAND gate having a first input, a second input and an output, said first input being adapted for application of said ignition voltage, said second input having said binary signal applied thereto, said output of said NAND gate being coupled to said second input of said first AND gate and developing said binary voltage; and an invertor coupled between said output of said NAND gate and said second input of said second AND gate.

6. A security system as set forth in claim 1 wherein said controller includes:

a one-shot circuit to develop a triggering pulse in response to said timer output signal; and a bi-stable circuit which develops said binary signal, said binary signal switching states in response to said triggering pulse.

7. A security system as set forth in claim 6 wherein said one-shot circuit includes:

a first D flip flop having a data input, a clock input, a reset input and a data output, said clock input being adapted for application of said timer output signal, said data input being adapted for application of a DC bias voltage;

a resistor coupled between said reset input and said data output;

a capacitor coupled between said reset input and ground potential, said resistor and said capacitor having respectively a resistance and capacitance which determine an RC time constant wherein said RC time constant determines a decay time of said trigger pulse developed at said data output.

8. A security system as set forth in claim 7 wherein said bi-stable circuit includes a second D flip flop having a data input, a clock input, an inverse data output and a reset input, said clock input of said second flip flop being coupled to said data output of said first flip flop, said reset input being coupled to ground potential, the data input of said second flip flop being coupled to said inverse data output, said inverse data output developing said binary signal.

9. A security system for a vehicle having an electrical system and an ignition switch movable between an open OFF position and a closed ON position wherein an ignition voltage is applied to a first selective circuit of said electrical system when said switch is in said ON position, said security system comprising:

a transmitter to transmit selectively an encoded signal;

a receiver to develop a decoded signal in response to reception and recognition of said encoded signal, said decoded signal having a reception time duration commensurate with a transmission time duration of said encoded signal;

a timer to develop a momentary timer output signal wherein said timer output signal is developed in response to initial application of said decoded signal to said timer in the absence of said ignition voltage and is developed after a selected time duration in response to continuous application of said decoded signal to said timer in the presence of said ignition voltage only if said reception time duration exceeds said selected time duration;

a controller to develop a binary signal, said binary signal switching states in response to each occurrence of said timer output signal, said binary signal having a first state indicative of said security system being armed and a second state indicative of said security system disarmed; and an anti-theft circuit responsive to said binary signal being in said first state to render a START position of said ignition switch inoperative.

10. A security system as set forth in claim 9 wherein said timer is further responsive to said binary signal such that said timer output signal is developed in response to initial application of said decoded signal when said ignition voltage is present and said binary signal is said first state.

11. A security system as set forth in claim 9 wherein said timer includes:

a first AND gate having a first input, a second input and an output;

a second AND gate having a first input, a second input and an output, said first input of each of said first AND gate and said second AND gate being adapted for application of said decoded signal thereto, said second input of said first AND gate being adapted for application of a binary voltage and said second input of said second AND gate being adapted for application of an inverse of said binary voltage, said binary voltage being indicative of the present position of said ignition switch;

an OR gate circuit having a first input, a second input and an output, said first output of said first AND gate being electrically coupled to said first input of said OR gate circuit; and a time delay circuit serially interconnected between said output of said second AND gate and said second input of said OR gate circuit;

said output of said first AND gate developing a first voltage when each of said decoded signal and said binary voltage are high indicating reception and recognition of said encoded signal and the absence of said ignition voltage, and said output of said second AND gate developing a second voltage when each of said decoded signal and said inverse of binary voltage are high indicating reception and recognition of said encoded signal and the presence of said ignition voltage;

said time delay circuit delaying application of said second voltage to said second input of said OR gate circuit for said preselected time duration; and said output of said OR gate circuit developing said timer output signal in response to either of said first voltage and said second voltage.

12. A security system as set forth in claim 11 wherein said time delay circuit includes:

a resistor electrically coupled serially between said output of said second AND gate and said second input of said OR gate circuit;

a capacitor electrically coupled between said second input of said OR gate circuit and ground potential, said resistor and said capacitor having respectively a resistance, R, and a capacitance, C, which determines a RC time constant where said RC time constant is commensurate with said preselected time duration; and a diode having an anode coupled to said second input of said OR gate circuit and a cathode coupled to said output of said second AND gate;

said second voltage developing a current in each of said resistor and said capacitor to charge said capacitor such that said second voltage becomes applied to said second input of said OR gate circuit when said second voltage is present for a time exceeding the preselected time duration;

said diode discharging said capacitor through said output of said second AND gate.

13. A security system as set forth in claim 12 wherein said timer further includes:

a NAND gate having a first input, a second input and an output, said first input being adapted for application of said ignition voltage, said second input having said binary signal applied thereto, said output of said NAND gate being coupled to said second input of said first AND gate and developing said binary voltage; and an invertor coupled between said output of said NAND gate and said second input of said second AND gate.

14. A security system as set forth in claim 9 wherein said controller includes:

a one-shot circuit to develop a triggering pulse in response to said timer output signal; and a bi-stable circuit which develops said binary signal, said binary signal switching states in response to said triggering pulse.

15. A security system as set forth in claim 14 wherein said one-shot circuit includes:

a first D flip flop having a data input, a clock input, a reset input and a data output, said clock input being adapted for application of said timer output signal, said data input being adapted for application of a DC bias voltage;

a resistor coupled between said reset input and said data output;

a capacitor coupled between said reset input and ground potential, said resistor and said capacitor having respectively a resistance, R, and a capacitance, C, which determine an RC time constant wherein said RC time constant determines a decay time of said trigger pulse developed at said data output.

16. A security system as set forth in claim 15 wherein said bi-stable circuit includes a second D flip flop having a data input, a clock input, an inverse data output and a reset input, said clock input of said second flip flop being coupled to said data output of said first flip flop, said reset input being coupled to ground potential, the data input of said second flip flop being coupled to said inverse data output, said inverse data output developing said binary signal.

17. A security system for a vehicle having an electrical system and an ignition switch movable between an open OFF position and a closed ON position wherein an ignition voltage is applied to a first selected circuit of said electrical system when said switch is in said ON position, said security system comprising:

a transmitter to transmit selectively an encoded signal;

a receiver to develop a decoded signal in response to reception and recognition of said encoded signal, said decoded signal having a reception time duration commensurate with a transmission time duration of said encoded signal;

a timer to develop a momentary timer output signal wherein said timer output signal is developed in response to initial application of said decoded signal to said timer in the absence of said ignition voltage and is developed after a selected time duration in response to continuous application of said decoded signal to said timer in the presence of said ignition voltage only if said reception time duration exceeds said selected time duration;

a controller to develop a binary signal, said binary signal switching states in response to each occurrence of said timer output signal, said binary signal having a first state indicative of said security system being armed and a second state indicative of said security system disarmed;

an alarm circuit to sound an audible alarm in response to a current being developed in a selected second circuit of said electrical system when said binary signal is in said first state; and an anti-theft circuit responsive to said binary signal being in said first state to render said ignition switch inoperative.

18. A security system as set forth in claim 17 wherein said timer is further responsive to said binary signal such that said timer output signal is developed in response to initial application of said decoded signal when said ignition voltage is present and said binary signal is said first state.

19. A security system as set forth in claim 17 wherein said timer includes:

a first AND gate having a first input, a second input and an output;

a second AND gate having a first input, a second input and an output, said first input of each of said first AND gate and said second AND gate being adapted for application of said decoded signal thereto, said second input of said first AND gate being adapted for application of a binary voltage and said second input of said second AND gate being adapted for application of an inverse of said binary voltage, said binary voltage being indicative of the present position of said ignition switch;

an OR gate circuit having a first input, a second input and an output, said first output of said first AND gate being electrically coupled to said first input of said OR gate circuit; and a time delay circuit serially interconnected between said output of said second AND gate and said second input of said OR gate circuit;

said output of said first AND gate developing a first voltage when each of said decoded signal and said binary voltage are high indicating reception and recognition of said encoded signal and the absence of said ignition voltage, and said output of said second AND gate developing a second voltage when each of said decoded signal and said inverse of binary voltage are high indicating reception and recognition of said encoded signal and the presence of said ignition voltage;

said time delay circuit delaying application of said second voltage to said second input of said OR gate circuit for said preselected time duration; and said output of said OR gate circuit developing said timer output signal in response to either of said first voltage and said second voltage.

20. A security system as set forth in claim 19 wherein said time delay circuit includes:

a resistor electrically coupled serially between said output of said second AND gate and said second input of said OR gate circuit;

a capacitor electrically coupled between said second input of said OR gate circuit and ground potential, said resistor and said capacitor having respectively a resistance, R, and a capacitance, C, which determines a RC time constant wherein said RC time constant is commensurate with said preselected time duration; and a diode coupled between said second input of said OR gate circuit and said output of said second AND gate;

said second voltage developing a current in each of said resistor and said capacitor to charge said capacitor such that said second voltage becomes applied to said second input of said OR gate circuit when said second voltage is present for a time exceeding the preselected time duration;

said diode discharging said capacitor through said output of said second AND gate.

21. A security system as set forth in claim 20 wherein said timer further includes:

a NAND gate having a first input, a second input and an output, said first input being adapted for application of said ignition voltage, said second input having said binary signal applied thereto, said output of said NAND gate being coupled to said second input of said first AND gate and developing said binary voltage; and an invertor coupled between said output of said NAND gate and said second input of said second AND gate.

22. A security system as set forth in claim 17 wherein said controller includes:

a one-shot circuit to develop a triggering pulse in response to said timer output signal; and a bi-stable circuit which develops said binary signal, said binary signal switching states in response to said triggering pulse.

23. A security system as set forth in claim 22 wherein said one-shot circuit includes:

a first D flip flop having a data input, a clock input, a reset input and a data output, said clock input being adapted for application of said timer output signal, said data input being adapted for application of a DC bias voltage;

a resistor coupled between said reset input and said data output;

a capacitor coupled between said reset input and ground potential, said resistor and said capacitor having respectively a resistance, R, and capacitance, C, which determine an RC time constant wherein said RC time constant determines a decay time of said trigger pulse developed at said data output.

24. A security system as set forth in claim 23 wherein said bi-stable circuit includes a second D flip flop having a data input, a clock input, an inverse data output and a reset input, said clock input of said second flip flop being coupled to said data output of said first flip flop, said reset input being coupled to ground potential, the data input of said second flip flop being coupled to said inverse data output, said inverse data output developing said binary signal.

* * * * *